US006629252B1

United States Patent
Gholami et al.

(10) Patent No.: US 6,629,252 B1
(45) Date of Patent: Sep. 30, 2003

(54) METHOD FOR DETERMINING IF A DELAY REQUIRED BEFORE PROCEEDING WITH THE DETECTED INTERRUPT AND EXITING THE INTERRUPT WITHOUT CLEARING THE INTERRUPT

(75) Inventors: Ghadir Robert Gholami, Austin, TX (US); Chetan Mehta, Austin, TX (US); John Daniel Upton, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/428,405

(22) Filed: Oct. 28, 1999

(51) Int. Cl.[7] .................... G06F 13/42; G06F 13/24; G06F 9/44
(52) U.S. Cl. .................... 713/401; 710/260; 712/244
(58) Field of Search .................... 713/401; 710/260, 710/261, 263, 262; 712/244

(56) References Cited

U.S. PATENT DOCUMENTS

| | | | | |
|---|---|---|---|---|
| 4,162,526 A | * | 7/1979 | Gass et al. .................... | 714/22 |
| 5,708,817 A | * | 1/1998 | Ng et al. .................... | 710/260 |
| 5,822,595 A | * | 10/1998 | Hu .................... | 710/264 |
| 5,862,389 A | * | 1/1999 | Kardach et al. ............ | 710/261 |
| 5,881,296 A | * | 3/1999 | Williams et al. ............ | 710/263 |

FOREIGN PATENT DOCUMENTS

JP   04195539 A  *  7/1992  ............. G06F/9/46

OTHER PUBLICATIONS

Fawaz et al, Analysis of interrupt handling schemes in real–time systems, 1989 IEEE, Department of EECS University of California Berkeley, California 94720.*

* cited by examiner

Primary Examiner—Thomas Lee
Assistant Examiner—Suresh K Suryawanshi
(74) Attorney, Agent, or Firm—Duke W. Yee; Mark E. McBurney; Lisa L. B. Yociss

(57) ABSTRACT

A method and system for servicing an interrupt is presented. An interrupt handler associated with a detected interrupt is invoked, and a determination is made as to whether to instantiate a delay before further servicing of the detected interrupt. If a delay is neccesary before the detected may be fully serviced, a delay counter is initialized to a first predetermined value. The interrupt handler then exits without fully servicing the detected interrupt. During subsequent invocations, the interrupt handler decrements the delay counter and checks whether the delay counter has reached a second predetermined value. The interrupt handler is repeatedly invoked while the interrupt remains pending and while the delay counter does not equal the second predetermined value, the interrupt handler may then fully service the interrupt and clear the interrupt.

32 Claims, 5 Drawing Sheets

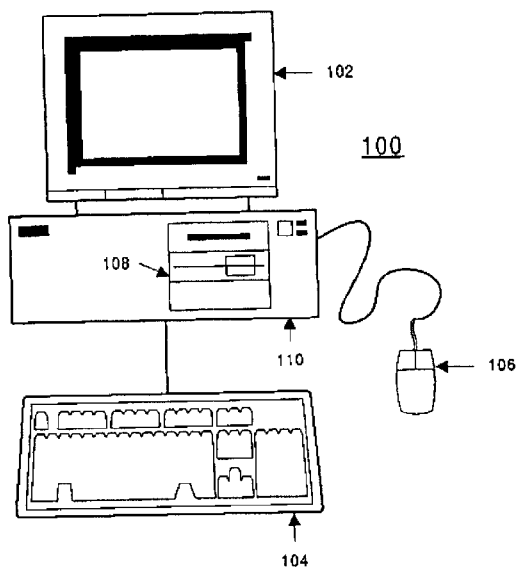
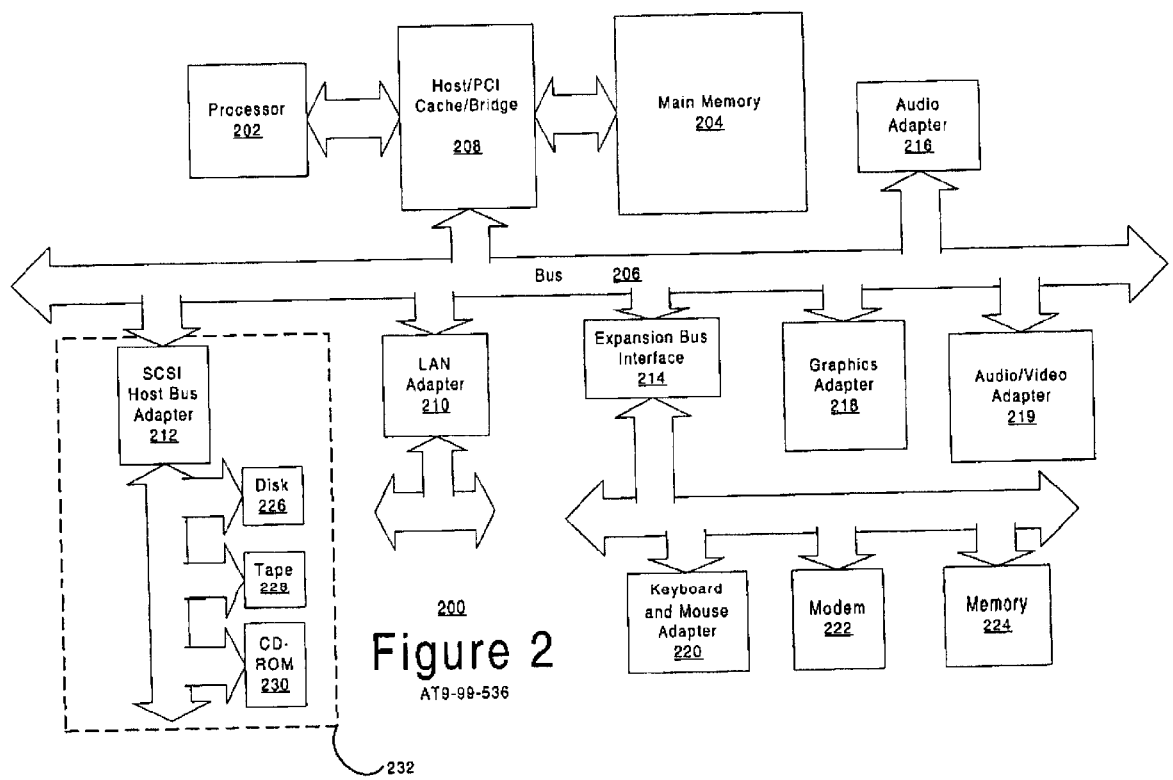

Prioritized Interrupt Levels
Prior Art
AT9-99-536

Main Interrupt Handler
Prior Art
AT9-99-536

Handling Interrupts
with Delay Counter
AT9-99-536

Design of Interrupt
Service Routine
AT9-99-536

A dual power supply server
with separate power sources
AT9-99-536

METHOD FOR DETERMINING IF A DELAY REQUIRED BEFORE PROCEEDING WITH THE DETECTED INTERRUPT AND EXITING THE INTERRUPT WITHOUT CLEARING THE INTERRUPT

BACKGROUND OF THE INVENTION

1. Technical Field

The present invention relates generally to an improved data processing system and in particular to a method and an apparatus for processing operating system interrupts. Still more particularly, the present invention provides a method to create delays for interrupt handlers at the interrupt system level.

2. Description of the Related Art

An operating system (OS) is essential for any general-purpose computer. The OS provides the fundamental layer of software between the user or application programs and the computer hardware. Some of the services provided by a typical operating system are program execution, input/output (I/O) operations, file-system manipulation, communications, error detection, resource allocation, accounting, and protection.

An operating system is a large, complex program that provides a large variety of services. The entire program need not be resident in memory at all times. However, there is a small kernel that is always resident in main memory. It does not run as a thread, i.e. a stream of execution, and so it cannot be pre-empted. It cannot be paged out to disk, that is, it cannot be removed from memory and written to the swap space on a disk. The kernel contains the most frequently used functions in the operating system, including thread scheduling, process switching, exception and interrupt handling, and multiprocessor synchronization.

The exact details of the interrupt handling mechanism are dependent on the specific computer architecture. However, for a wide variety of architectures, a vectored interrupt scheme is used. Each device that can cause an interrupt is assigned a unique number, and a table is built with the address for the first instruction in the interrupt service routine for each of the devices. When an interrupt occurs, the current instruction of the running process is completed, and the processor acknowledges receipt of the interrupt. A minimum amount of information, e.g., the processor status word (PSW) and the program counter (PC), is saved for the current process. The starting address for the interrupt service routine is loaded from the interrupt vector table into the program counter, and execution of the interrupt service routine commences. Depending on the resources needed by the interrupt service routine, e.g., the need for registers, additional data from the interrupted process may be saved. After the interrupt is serviced, the processor state for the interrupted routine is restored and control is transferred back to that routine once the previous PSW and PC values are reloaded.

Hardware interrupts come from many sources, including, but not limited to, program interrupts (e.g., divide by zero error, illegal instruction, etc.), timer interrupts based on a built-in timer, input/output interrupts to signal completion of an input/output operation, and hardware failure interrupts (e.g., power failure, parity error, etc.). Software interrupts, often called traps, are used by application programs to request a service to be performed by the operating system. It can be seen that interrupts handle both abnormal situations, e.g., power failure, and normal situations, e.g., completion of I/O.

Several issues related to interrupts must be considered, such as whether all interrupts have equal priority. From the range of situations outlined above, it is evident that some interrupts, such as power failure, have much higher priority than other interrupts, such as completion of input/output. Modern systems establish a hierarchy of interrupt priorities and allow a higher priority device to interrupt the service routine for a lower priority device.

Another important consideration is the time it takes to perform an interrupt task switch. This is the time between the invocation of the main interrupt routine, which processes and routes all interrupts, and the execution of the first instruction associated with an interrupt handler for a particular interrupt being serviced. If the interrupt service routine invoked by the interrupt handler can service the interrupt in a reasonably short time compared with the time for an interrupt task switch, then it is most efficient to keep other interrupts masked and complete the interrupt service routine. If the time for the interrupt service routine is considerably longer than the time for the interrupt task switch, it may be desirable to unmask interrupts so that higher priority devices can be serviced. To support this capability, the interrupt service routines have to be made reentrant, i.e. an interrupt service routine needs to save state if a higher priority interrupt is received and be able to resume, once the higher priority interrupt has been serviced. Writing reentrant code adds complexity to the interrupt service routine and has a negative influence on system performance.

It is sometimes necessary to delay the start of an interrupt service routine or to wait to perform some type of processing within the interrupt service routine in order to determine the status of other system devices. This status information is then used to determine the proper action to be performed by the interrupt service routine. In other circumstances, it may be necessary to allow some other higher priority interrupt operation to be performed before the pending interrupt service routine is processed. In circumstances such as these, it would be advantageous to have a method and mechanism to be able to delay processing within an interrupt service routine without having to write reentrant code that saves and restores its execution state and at the same time allow servicing of any higher priority interrupts if they were to occur.

SUMMARY OF THE INVENTION

A method and system for servicing an interrupt is presented. An interrupt handler associated with a detected interrupt is invoked, and a determination is made as to whether to instantiate a delay before further servicing of the detected interrupt. If a delay is necessary before the detected interrupt may be fully serviced, a delay counter is initialized to a first predetermined value in which the initialization value is predetermined such that a minimum time period will elapse while the interrupt remains pending. The interrupt handler then exits without fully servicing the detected interrupt or without clearing the interrupt, i.e., the interrupt remains "hot". The data processing system may immediately service other interrupts, but because the interrupt remains pending, the interrupt handler associated with the uncleared interrupt is again invoked. During subsequent invocations, the interrupt handler decrements the delay counter and checks whether the delay counter has reached a second predetermined value. If not, the interrupt handler again exits without clearing the interrupt. The interrupt handler is repeatedly invoked while the interrupt remains pending and while the delay counter does not equal the second predetermined value. In response to a determination that the delay counter equals the second predetermined value, the interrupt handler may then fully service the interrupt and clear the interrupt.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented;

FIG. 2 is a block diagram illustrating a data processing system in which the present invention may be implemented;

DETAILED DESCRIPTION OF THE PREFERRED EMBODIMENT

Figure 3:
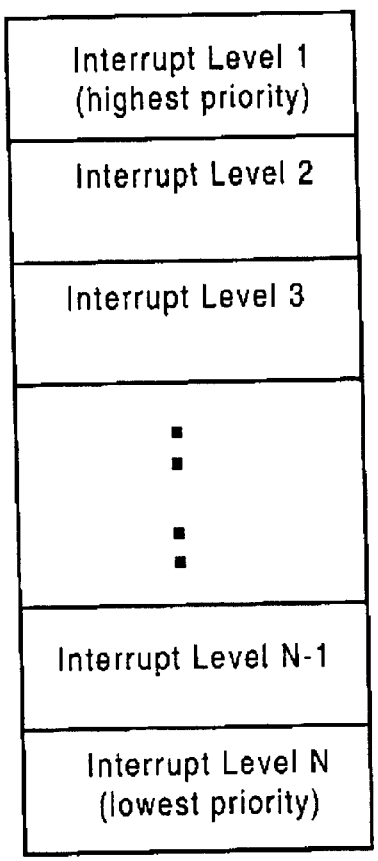
FIG. 3 is a diagram illustrating interrupt priorities as present in the prior art.

With reference now to the figures, and in particular with reference to FIG. 1, a pictorial representation depicts a data processing system in which the present invention may be implemented. Personal computer 100 is depicted which includes system unit 110, video display terminal 102, keyboard 104, storage devices 108, which may include floppy drives and other types of permanent and removable storage media, and mouse 106. Additional input devices may be included with personal computer 100. Personal computer 100 can be implemented using any suitable computer. Although the depicted representation shows a personal computer, other embodiments of the present invention may be implemented in other types of data processing systems, such as servers, workstations, network computers, Web-based television set-top boxes, Internet appliances, etc.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, any other bus architecture may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. The depicted example shows a local area network (LAN) adapter 210, small computer system interface SCSI host bus adapter 212, expansion bus interface 214, audio adapter 216, graphics adapter 218, and audio/video adapter 219. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be any available operating system. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system. The depicted example computer system in FIG. 1 and FIG. 2 are not meant to imply architectural limitations.

With reference now to FIG. 3, a diagram shows a typical priority structure of interrupts. The N interrupts shown range from Level 1 (highest priority) to Level N (lowest priority). Those of ordinary skill in the art will appreciate that a system could assign Level 1 as the lowest priority and Level N as the highest priority provided the relative priorities of interrupts can be compared and the higher priority interrupt can be identified.

Figure 4:
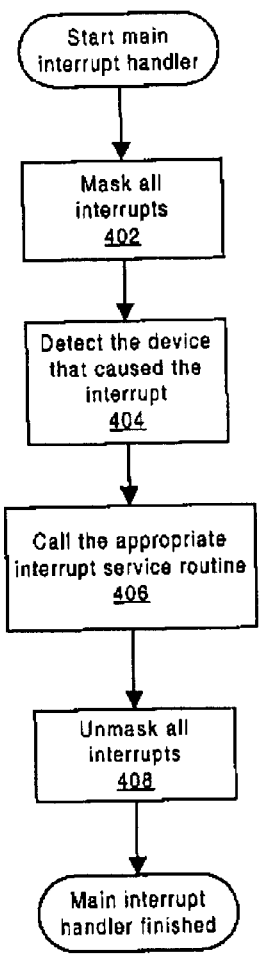
FIG. 4 is a flowchart illustrating the main interrupt handler as present in the prior art.
Figure 5:
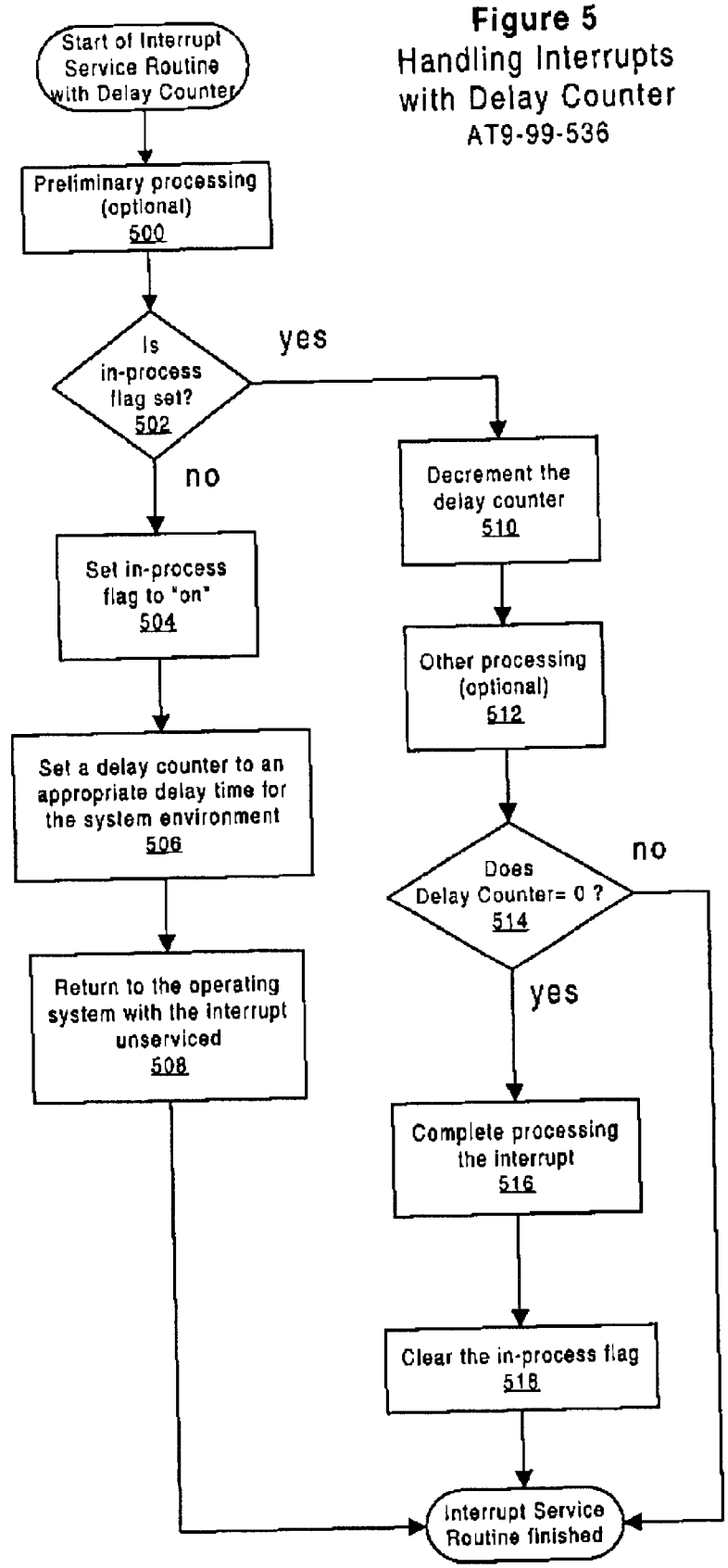
FIG. 5 is a flowchart illustrating an interrupt service routine with a delay counter in accordance with a preferred embodiment of the present invention.

With reference now to FIG. 4, a flowchart shows a main interrupt handler as found in the prior art. When an interrupt occurs, the state of the current process is saved and control is transferred to the main interrupt service routine. The main service routine masks all other interrupts from occurring (step 402) and detects the device that caused the interrupt (step 404). The appropriate interrupt service routine is invoked (step 406). When control is transferred back to the main interrupt handler, all interrupts are unmasked (step 408). Those of ordinary skill in the art will appreciate that different computer systems may provide different mechanisms for masking or disabling interrupts and for unmasking or re-enabling interrupts. With reference now to FIG. 5, a flowchart shows the operation of an interrupt service routine with a delay counter in accordance with a preferred embodiment of the present invention. Initially, the interrupt service routine does some preliminary processing (step 500). The main purpose of this preliminary processing is to determine whether all information required to completely service the interrupt is available. If additional information is required, an in-process flag is used to signal that a delay counter is active. The flag and the initial counter value have to be set the first time the interrupt is called when a delay is to be required. The delay counter is not a system timer, rather it is a simple counter that is stored in nonvolatile system memory, such as found in the BIOS (Basic Input/Output System). The counter is a positive integer that is decremented by one until zero is reached; it does not contain "wall time" or "system time". Alternatively, a condition of the delay counter, such as the condition that the delay counter is non-zero, may be used as an indication that the delay counter is active and that processing has already commenced for the interrupt service routine associated with the detected interrupt.

If the in-process flag has not yet been set (detected in step 502), then the in-process flag is set to "on" to indicate that a delay counter is running (step 504). The initial counter value is calculated or predetermined as a design parameter when the service routine is written; the delay counter is set to this value (step 506). This value will guarantee a minimum delay time assuming that the system is not performing any other significant work at the time. However, in practice, the delay will only be a minimum time. If the system is engaged in handling other interrupts, then the actual delay may be longer. After counter initialization, the interrupt service routine is finished with its current loop but the actual interrupt has not been fully serviced (step 508). Control is transferred back to the operating system, but at least one interrupt, i.e. the interrupt with the newly initialized delay counter, is still pending. Since the interrupt is still "hot", then the main interrupt handler is immediately invoked again.

After the first invocation of the interrupt service routine with the delay counter, after the optional preliminary processing is completed, it is determined that the in-process flag has been set (step 502) indicating that a delay counter is already active. The delay counter value will be decremented by one (step 510). Other optional processing may be performed at this time (step 512). The delay counter is checked to see if it has reached zero (step 514). Alternatively, the delay counter may be checked against a predetermined value other than zero. If the counter has not reached zero, the interrupt service routine is finished for this call or current loop, but the actual interrupt has not yet been fully serviced, i.e. the interrupt is still "hot". Therefore, interrupt processing will occur again, and the system devotes a majority of its time handling interrupts.

In this manner, the interrupt associated with the delay counter receives a "pause" in its processing through a looping delay in the execution of the interrupt's associated interrupt service routine and the overhead execution required to invoke repeatedly the interrupt service routine for the interrupt. In addition, the delayed or paused processing for the interrupt does not prevent other higher priority interrupts from being processed since execution control is returned to the main interrupt handler.

If, during this particular call, the delay counter reaches zero (step 514), then the minimum delay time has occurred (possibly along with additional time). The remainder of the interrupt service routine is now executed (step 516) completing the servicing of the interrupt. This servicing results in the resetting of the "hot" interrupt. Since the same device might cause another interrupt in the future that requires the delay mechanism, the in-process flag is cleared (step 518). Control is then returned to the operating system.

Figure 6:
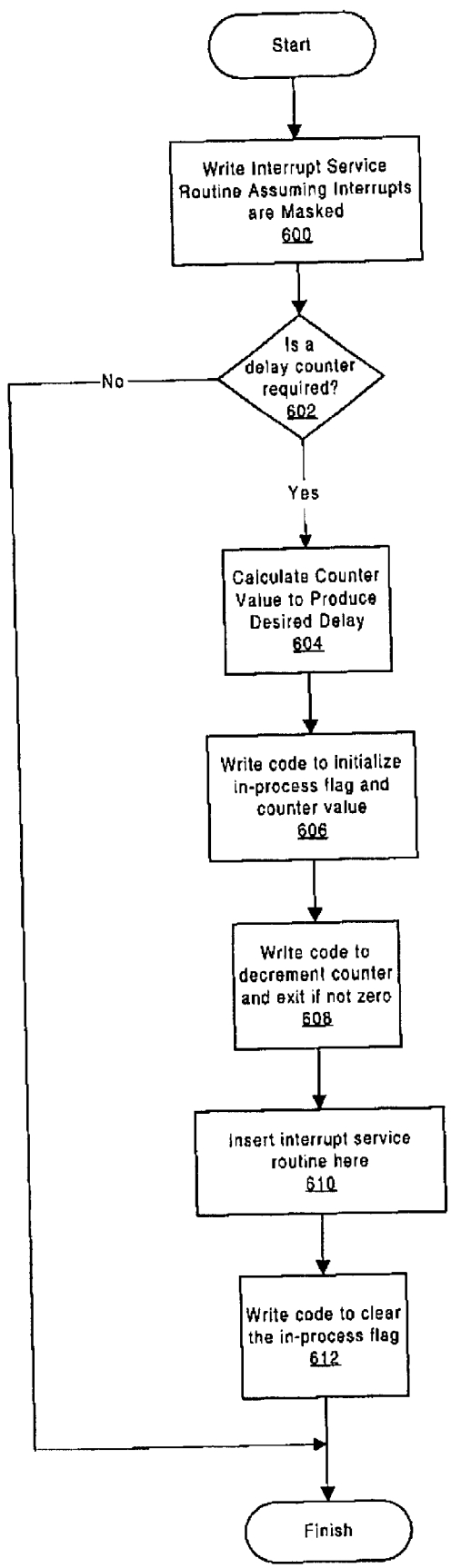
FIG. 6 is a flowchart illustrating the design of an interrupt service routine in accordance with a preferred embodiment of present invention.

With reference now to FIG. 6, a block diagram shows the design or development of interrupt service routines in accordance with a preferred embodiment of the present invention. The interrupt service routine is written based on the assumption that the code is not reentrant and other interrupts are masked (step 600). If a delay counter is not required (step 602), then the interrupt service routine is developed using known methods. However, if a delay counter is needed (step 602), then appropriate "wrapper code" must be placed around the core processing of the interrupt service routine in order to impose a delay before the core processing of the interrupt service routine is commenced and completed. Such a delay may be required if servicing of the interrupt requires information about the cause of the interrupt or circumstances associated with the interrupt that may not be available within the time constraints imposed on the interrupt service routine by the operating system or hardware system design parameters.

The initial counter value must be calculated based on the characteristics of the computer system and the minimum desired delay time (step 604). Suppose steps 402, 404, and 406 in the main interrupt routine shown in FIG. 4 require 400 nanoseconds to run. Furthermore, suppose steps 502, 510, 512, and 514 in the interrupt service routine with delay counter shown in FIG. 5 require 600 nanoseconds to run. The total time to decrement the delay counter by one is 1 microsecond. If a minimum delay of 2 seconds is desired, then the initial counter value should be at least 2,000,000 (=2 second/ 1 microsecond).

Once the initial counter value is determined, the code to check and initialize the in-process flag and to initialize the delay counter can be written (step 606). The code to decrement the counter and exit the service routine on a nonzero value is written (step 608). If the counter is zero, then the code of the interrupt service routine is placed next (step 610). Finally, code is written to clear the in-process flag (step 612) to complete the interrupt service routine.

When an interrupt handler with a delay counter is used, the system is busy processing only interrupts, and regular application programs are not allotted execution time.

The method proposed in this invention is generally intended for use when the system is experiencing "abnormal" conditions in which the processing of an interrupt requires a pause or wait for some type of status information before the interrupt can be fully serviced. The situation outlined below illustrates one use of the present invention during the abnormal condition of a power failure in a server system that has been built with fault tolerant capability.

Figure 7:
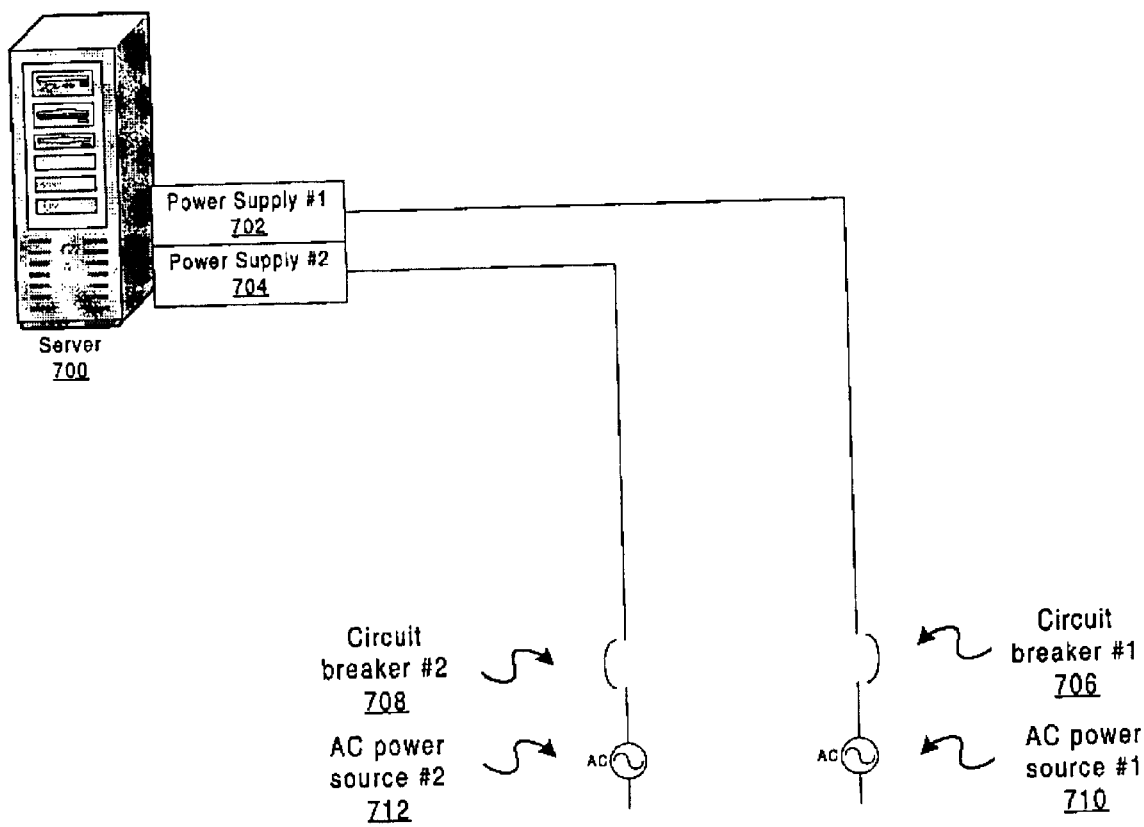
FIG. 7 is a block diagram of a computer server with dual power supplies where interrupt delays may be used in accordance with a preferred embodiment of the present invention.

With reference now to FIG. 7, a block diagram shows a computer server with dual power supplies that will use the interrupt processing delay mechanism of the present invention. Server 700 is equipped with dual, independent power supplies 702 and 704. To maximize system redundancy, these supplies may be run off two different circuit breakers 706 and 708 and, if practical, independent AC power lines 710 and 712. A system with a single power supply, even if equipped with an external Uninterruptable Power Supply (UPS), would fail if the power supply itself failed, the UPS failed, or if a system circuit breaker or fuse failed. Having dual, independent power systems clearly adds an additional level of fault tolerance.

However, having dual power supplies introduces a potential problem. When a power supply loses power, it sends a "power failure interrupt" to the computer system. Clearly, this type of interrupt represents an extreme circumstance and, in the case of a single power supply, is dealt with as quickly as possible since there may only be a fraction of a second of useful computing time remaining to gracefully shut down as much of the system as possible. With two independent power supplies, the situation is more complex. When a power failure interrupt occurs, it must be determined if both supplies failed or whether only the supply sending the interrupt failed. Both power supplies may seem to fail in the case of a complete or partial ("brown-out") power loss to the whole complex housing the system. Due to normal manufacturing tolerances, each power supply will report the loss at slightly different times. Therefore, full processing of a first power failure interrupt needs to be postponed to see whether or not a second power failure interrupt is received. This delay cannot be accomplished as a busy-wait loop inside of the interrupt handler for the first power failure interrupt since this would block the second interrupt, if forthcoming, from being detected. Hence, full processing of the first interrupt must be delayed, and other higher priority interrupts are allowed to be processed. If the second power failure interrupt is detected, then drastic shut down procedures are initiated immediately. However, if after a small delay, e.g., 2 seconds, the second supply has not sent a second power failure interrupt, then the second supply is most likely still functional, and the drastic shutdown need not be initiated. However, the first interrupt service routine should send out notification that one of the power supplies failed.

The above scenario outlines one particular circumstance where the interrupt delay method and system outlined in this invention is useful. Those of ordinary skill in the art will appreciate that the same method and system can be used in a variety of circumstances. In general, there may be multiple hardware interrupts representing abnormal conditions occurring in a computing system in a short period of time, particularly when some type of failure is occurring. The correct choice of action may depend on which combination of interrupts occurred or did not occur in a short period of time. By using the interrupt delay mechanism outlined in this invention, enough information can be gathered within the interrupt processing system to determine the most appropriate course of action.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROM and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for servicing an interrupt, the method comprising the computer-implemented steps of:
   invoking an interrupt handler associated with a detected interrupt;
   determining whether additional information is needed in order to service the detected interrupt; and
   in response to a determination that additional information is needed, instantiating a delay before further servicing of the detected interrupt, and exiting the handler without clearing the interrupt.

2. The method of claim 1 further comprising:
   instantiating said delay counter; and
   initalizing said delay counter to a first predetermined value.

3. The method of claim 2 further comprising:
   invoking the interrupt handler associated with the uncleared interrupt;
   decrementing the delay counter, and
   in response to a determination that the delay counter does not equal a second predetermined value, exiting the interrupt handler without clearing the interrupt.

4. The method of claim 3 further comprising:
   repeatedly invoking the interrupt handler associated with the uncleared interrupt while the delay counter does not equal the second predetermined value.

5. The method of claim 3 further comprising:
   reinvoking the interrupt handler associated with the uncleared interrupt; and
   in response to a determination that the delay counter equals the second predetermined value, performing processing associated with servicing the interrupt.

6. The method of claim 5 further comprising:
   clearing the interrupt.

7. The method of claim 1 further comprising:
   in response to a determination that additional information is needed, initializing a delay counter to a first predetermined value.

8. The method of claim 7, further comprising the steps of:
   checking an in-process flag that indicates whether the interrupt handler has commenced processing of the interrupt;
   in response to a determination that said flag is not set, setting said flag to indicated that the interrupt handler has commenced processing of the interrupt; and
   in response to a determination that said flag is set, decrementing said delay counter.

9. The method of claim 7 further comprising:
   setting an in-process flag to indicate that the interrupt handler has commenced processing of the interrupt.

10. The method of claim 9 further comprising:
    reinvoking the interrupt handler associated with the uncleared interrupt;
    in response to a determination that the in-process flag has been previously set. decrementing the delay counter.

11. The method of claim 10 further comprising:
    the response to a determination that the delay counter equals a second predetermined value, clearing the in-process flag.

12. The method of claim 1 further comprising:
    servicing an interrupt other than the uncleared interrupt while processing of said uncleared interrupt is delayed.

13. The method of claim 1 wherein the interrupt handler is a main interrupt handler.

14. The method of claim 1 wherein the interrupt handler is associated with a type of interrupt for the detected interrupt.

15. The method of claim 1 further comprising:
    detecting an interrupt;
    invoking a main interrupt handler;
    determining an interrupt handler associated with a type of interrupt for the detected interrupt; and
    invoking the interrupt handler associated with the detected interrupt.

16. A data processing system for servicing an interrupt, the data processing system comprising:
    fist invoking means for invoking an interrupt handler associated with a detected interrupt:
    first determining means for determining whether additional information is needed in order to service the detected interrupt; and
    in response to a determinating that additional information is needed, instantiating a delay before further servicing of the detected interrupt, and exiting means for exiting the interrupt handler without clearing the interrupt.

17. The data processing system of claim 16 further comprising:
a delay counter for instantiating said delay; and
first initializing means for initializing said delay counter to a first predetermined value.

18. The data processing system of claim 17 further comprising:
decrementing means for decrementing the delay counter.

19. The data processing system of claim 18 further comprising:
performing means for performing in response to determination that the delay counter equals the second predetermined value, processing associated with servicing the interrupt.

20. The data processing system of claim 19 further comprising:
clearing means for clearing the interrupt.

21. The data processing system of claim 16, further comprising:
checking means for checking an in-process flag indicated whether the interrupt handler has processing of the interrupt;
in response to a determination that said flag is not set, setting means for setting said flag to indicate that the interrupt handler has commenced processing of the interrupt; and
in response to a determination that said flag is set, decrementing means for decrementing said delay counter.

22. The data processing system of claim 16 further comprising:
setting means for setting an in-process flag to indicate that the interrupt handler has commenced processing of the interrupt.

23. The data processing system of claim 16 further comprising:
servicing means for servicing an interrupt other than the uncleared interrupt while processing of said uncleared interrupt is delayed.

24. The data processing system of claim 16 wherein the interrupt handler is a main interrupt handler.

25. The processing system of claim 16 wherein the interrupt handler is associated with a type of interrupt for the detected interrupt.

26. The data processing system of claim 16 further comprising:
detecting means for detecting for detecting an interrupt;
second invoking means for invoking a main interrupt handler; and
second determining means for determining an interrupt handler associated with a type of interrupt for the detected interrupt.

27. A computer program product in a computer-readable medium for use in a data processing system for servicing an interrupt, the computer program product comprising:
instructions for invoking an interrupt handler associated with a detected interrupt;
instructions for determining whether additional information is needed in order to service the detected interrupt; and
instructions for instantiating a delay before further servicing of the detected interrupt in response to a determination that additional information is needed, and instructions for exiting the interrupt handler without clearing the interrupt.

28. The computer program product of claim 27 further comprising:
instructions for instantiating said delay utilizing a delay counter; and
instructions for initializing a delay counter to a first predetermined value.

29. The computer program product of claim 28 further comprising:
instructions for reinvoking the interrupt handler associated with the uncleared interrupt;
instructions for decrementing the delay counter; and
instructions for exiting, in response to a determination that the delay counter does not equal a second predetermined value, the interrupt handler without clearing the interrupt.

30. The computer program product of claim 29 further comprising:
instructions for repeatedly invoking the interrupt handler associated with the uncleared interrupt while the delay counter does not equal the second predetermined value.

31. The computer program product of claim 29 further comprising:
instructions for invoking the interrupt handler associated with the uncleared interrupt; and
instruction for performing, in response to a determination that the delay counter equals the second predetermination value, processing associated with servicing the interrupt.

32. The computer program product of claim 31 further comprising:
instruction for clearing the interrupt.

* * * * *

UNITED STATES PATENT AND TRADEMARK OFFICE
CERTIFICATE OF CORRECTION

PATENT NO. : 6,629,252 B1
DATED : September 30, 2003
INVENTOR(S) : Gholami et al.

It is certified that error appears in the above-identified patent and that said Letters Patent is hereby corrected as shown below:

Title page,
Item [57], ABSTRACT,
Line 5, after "detected" insert -- interrupt --.
Line 13, after "predetermined" insert -- value. In response to a determination that the delay counter equals the second predetermined --.

Column 7,
Line 55, after "exiting the" insert -- interrupt --.
Line 58, after "delay" insert -- utilizing a delay --.

Column 8,
Line 33, after "set" delete "." and insert -- , --.
Line 35, before "response" delete "the" and insert -- in --.
Line 56, before "invoking" delete "fist" and insert -- first --.
Line 56, after "interrupt" delete ":" and insert -- ; --.

Column 9,
Line 11, after "means for" delete "performing in response to" and insert -- performing, in response to a --.
Line 20, after "flag" delete "indicated" and insert -- that indicates --.
Line 21, after "has" insert -- commenced --.
Line 47, after "for detecting" delete "for detecting".

Column 10,
Lines 42-43, after "second" delete "predetermination" and insert -- predetermined --.

Signed and Sealed this

First Day of February, 2005

JON W. DUDAS
*Director of the United States Patent and Trademark Office*